July 7, 1970   T. E. FOSTER   3,519,004
DENTAL FLOSS HOLDER AND DISPENSER
Filed Sept. 22, 1967
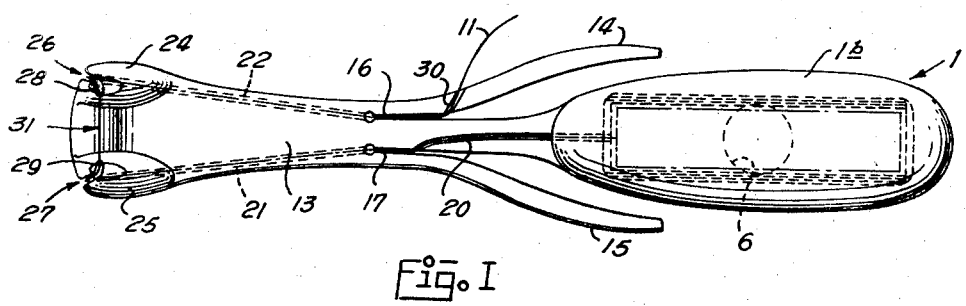
Fig. I
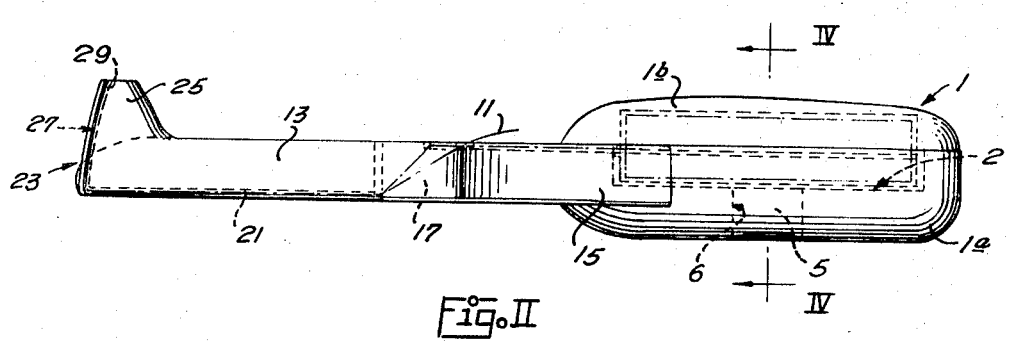
Fig. II
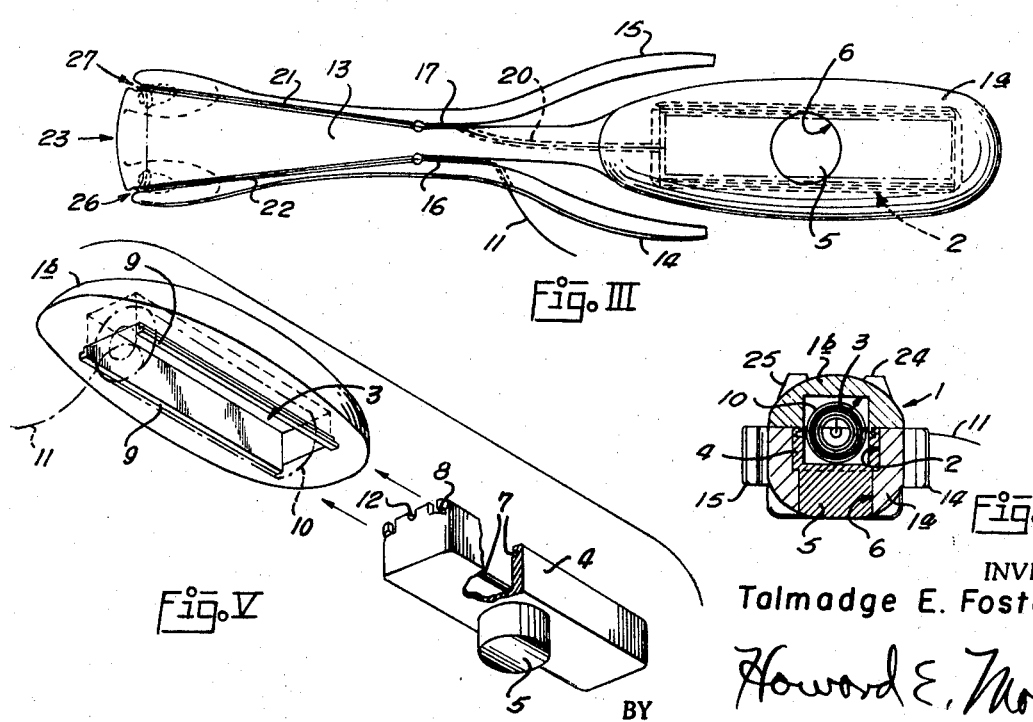
Fig. III
Fig. V
Fig. IV
INVENTOR
Talmadge E. Foster
BY  Howard E. Moore
ATTORNEY

United States Patent Office 3,519,004
Patented July 7, 1970

---

3,519,004
DENTAL FLOSS HOLDER AND DISPENSER
Talmadge E. Foster, 6618 Belmead Drive,
Dallas, Tex. 75230
Filed Sept. 22, 1967, Ser. No. 669,777
Int. Cl. A61c 75/00
U.S. Cl. 132—92          9 Claims

ABSTRACT OF THE DISCLOSURE

An integral dental floss holder and dispenser wherein the dental floss may be progressively drawn from a spool disposed in the handle, and having an elongated neck portion thereon with a head at the outer end thereof having spaced prongs between which sections of dental floss may be progressively extended for use, with gripping prongs extending outwardly of the elongated neck providing slots through which the dental floss is extended and may be grippingly engaged to hold same in taut position between the prongs on the head.

---

This invention is addressed to an improvement over the type of dental floss holder and dispenser disclosed and claimed in my prior Pat. No. 3,311,116, issued on Mar. 28, 1967, entitled "Dental Floss Holder and Dispenser."

Although the embodiment shown in said patent constituted an improvement over prior devices of the same general character, and was well adapted to carry out the objects and advantages of the invention disclosed and claimed in said patent, the embodiment disclosed and claimed herein includes certain improvements over that disclosed in said patent.

For instance, in the embodiment disclosed herein, the dental floss is grippingly engaged by spring prongs on each side of the elongated neck of the device so as to securely engage and hold same.

In the embodiment shown in said patent, the slot in which the dental floss is gripped extends substantially medially of the elongated neck and terminates near the outer end of said neck and it was found that in order to hold the dental floss in taut position, it was necessary to grip it at two points, two-wit, at both the feed in and lead out points. By reason of the flexibility of the material and the length of the slot, such was found to be difficult to do.

In the embodiment disclosed herein, the gripping prongs are located on each side of the elongated neck and terminate substantially at the mid-point of the length of the neck, and the slots between the prongs and the neck are spaced apart and tapered toward the point where the thread is drawn therethrough so as to provide a firm and secure gripping engagement with the dental floss on each side of the neck, yet allows the dental floss to be easily drawn through the guide slots and about the head to progressively expose clean sections of dental floss for cleaning between the teeth of the user.

The holder and the receptacle for the dental floss spool can be made in the form of an integral sealed container for the dental floss spool or the dental floss spool may be placed in and withdrawn from the handle by the simple expedient of removing the cover on the handle by sliding it longitudinally thereof to disengage the interlocked grooves and ribs between the cover and the receptacle.

As was the case in the embodiment shown in said patent, the guide slots in which the dental floss are disposed and moves are all open and exposed exteriorly so that the device can be thoroughly cleaned and sterilized.

Other and further objects of the invention will become apparent upon reading the detailed specification hereinafter following and by referring to the drawing annexed thereto.

BRIEF DESCRIPTION OF THE DRAWING

A suitable embodiment of the invention is disclosed in the attached drawing wherein, FIG. I is a bottom plan view of the dental floss holder and dispenser;
FIG. II is a side elevational view thereof;
FIG. III is a top plan view thereof;
FIG. IV is a transverse sectional view taken along the line IV—IV of FIG. II,
FIG. V is an exploded bottom view of the combination cover and removable dental floss spool holder which may be made as a sealed integral unit or as separable parts.

DESCRIPTION OF THE PREFERRED EMBODIMENT

Numeral references are employed to indicate the various parts shown in the drawing and like numerals indicate like parts throughout the various figures of the drawing.

The numeral 1 generally indicates a handle which is made up of a fixed portion 1a and a removable cover portion 1b.

The fixed portion 1a is integrally secured to the elongated neck portion 13 of the device and has a rectangular shaped cavity 2 formed therein. The handle portion 1b has a cavity 3 formed therein.

A spool receptacle 4 has a cylindrical extension 5 formed on the lower surface therof which is arranged to be faced by frictional fit into a circular passage 6 provided through the lower wall of the fixed portion 1a of the handle 1.

The receptacle 4 may be provided with parallel grooves 7 on the upper inner sides thereof which open through the edges of one end of the receptacle 4 through the slots 8.

Outwardly extending parallel ribs 9 are formed on each side of the cavity 3 of the removable handle portion 1b so as to extend outwardly therefrom. The ends of the ribs 9 are arranged to be inserted through the slots 8 and slightly moved along the grooves 7 to provide disengageable attachment of the cover 1b to the spool receptacle 4.

A spool 10 of conventional dental floss may be inserted into the cavity 3 of the removable cover 1b or into the receptacle 4 and the receptacle attached to the cover by sliding the grooves 7 along the ribs 9. The assembled cover and receptacle may then be inserted into the cavity 2 of the fixed portion 1 of the handle and the cylindrical extension 5 frictionally forced into the passage 6. The free end of the dental floss 11 is withdrawn through the slot 12 provided in the end of the receptacle 4 and strung about the device in the manner hereinafter described.

It will be understood, that the members 1b and 4 can be sealed together into an integral unit after the dental floss is placed therein to provide an integral, sealed container which may be inserted into the cavity of the fixed handle portion 1a.

Parallel spring prongs 14 and 15 are integrally attached to the neck portion 13 of the device and are spaced from the said neck portion 13 by slots 16 and 17. The slots 16 and 17 are normally wide enough to permit the dental floss 11 to be easily drawn therethrough when the prongs 14 and 15 are in relaxed position, but when the prongs are sprung inwardly by grasping same, the dental floss 11 will be tightly gripped between the inner ends of the prongs and the elongated neck 13.

An open channel 20 is provided on the inner surface of the neck 13 in which the dental floss 11 may be disposed. The dental floss is then passed through the slot 17 between the prong 15 and the neck 13 and is extended into an open slot 21 provided on the outer surface of the neck 13 and about the head 23 in the manner hereinafter described.

The head 23 is integral with neck 13 and has formed thereon a pair of spaced apart right angular fixed prongs 24 and 25. Open channels 26 and 27 are formed on the outer face of the prongs 24 and 25 which terminate in transversely aligned slots 28 and 29 formed in the outer ends of the prongs.

The dental floss 11, after being inserted in the open channel 21 in the manner hereinbefore described, is passed along the open channel 27 through the slots 28 and 29, through the open channel 26, open channel 22 extending along the upper surface of the neck 13, and inserted through the slot 16 between the prong 14 and the neck 13. The free end thereof may be inserted in a locking slot 30, if desired.

It will be noted that a portion 31 of the dental floss extends between the outer ends of the prongs 24 and 25. When the spring prongs 14 and 15 are grasped between the thumb and the fingers and flexed inwardly, the dental floss extending through the slots 16 and 17 will be gripped and pressed between the prongs and the neck 13 to thereby rigidly support same and maintain the portion 31 in taut condition.

The neck 13 and head 23 is of such dimension as to be insertable into the mouth and placed into position so that the dental floss portion 31 may be inserted between the teeth to clean same.

When it is desired to expose a fresh, clean strand of dental floss 31 between the prongs 24 and 25, the free end of the dental floss 11 may be grasped and pulled to unwind an additional quantity from the spool 10 as it slides along the passages through which it is threaded. It may then be used by inserting the head 23 into the mouth and passing the clean strand of dental floss 31 between the teeth. When the supply of dental floss on the spool 10 is used up, a new spool may be inserted in the holder 4 which is then attached to the cover 1b, or if the container is sealed, a new container may be inserted into the handle. The free end of the dental floss is then passed through the slot 12, along the guide passages 20, 21 and 22, and about the head 23 in the manner hereinbefore described.

Preferably, the device should be made of hard plastic, metal, composition or other material having a smooth finish and having spring-like qualities, so that the dental floss may be drawn through the various passages and slots through which it extends with minimum friction, and without binding. The size and proportions of the various parts of the device may be varied to make it easy to manipulate and insert into the mouth; and, of course, the form of the capsule or container for the dental floss, and the means of inserting the spool therein may be varied.

It will be understood that other and further embodiments of the invention may be devised without departing from the spirit and scope of the appended claims.

Having described my invention, I claim:

1. In a dental floss holder and dispenser, a handle; a dental floss spool container positioned in the handle, said container being removable to permit replacement of dental floss spools therein, said container comprising portions having mutually disengageable interlocking means thereon; means retaining the container in the handle; a dental floss spool disposed in the container; a dental floss dispensing passage extending through the wall of the container through which dental floss may be drawn; a neck portion extending from the handle; a head on the outer end of the neck portion; spaced prongs on the head turned substantially right angularly with respect to the neck portion; a flexible gripping member disposed on each side of the neck portion and being spaced therefrom, but being arranged to be pressed into engagement with the neck portion; an open channel on the inner side of the neck portion communicating with the passage from the container and with the space between the neck portion and one of the gripping members; a pair of spaced channels extending longitudinally of the side of the handle opposite the side on which the first named channel is disposed, said pair of channels terminating at the ends of the spaces between the gripping members and the neck; a channel on the outer face of each of the prongs, each said channel communicating with one of the pair of channels; and slots in the outer ends of the prongs communicating with the channels on the faces of the prongs.

2. The combination called for in claim 1 wherein the gripping members have extensions extending on each side of the handle whereby the extensions may be engaged between the thumb and fingers of the user to press same against the neck portion to grippingly engage dental floss therebetween.

3. The combination called for in claim 1 wherein the portions of the container are integrally sealed together after the dental floss is placed therein.

4. The combination called for in claim 1 wherein the means for retaining the container in the handle comprises a passage through the wall of the handle; and an extension on the container arranged to be frictionally inserted in the passage.

5. The combination called for in claim 1 wherein the passage from the container extends through the wall of the handle.

6. In a dental floss holder and dispenser a handle; a container, said container comprising portions having mutually disengageable interlocking means thereon; means detachably securing said container to the handle; a spool of dental floss disposed in the container; passage means from the container for withdrawing the dental floss therefrom; a neck portion extending from the handle; an open channel on the inner side of the neck portion; a pair of longitudinal open channels on the opposite side of the neck portion; a head portion at the outer end of the neck portion; spaced guide means on the head portion; an open channel on the face of each of the spaced guides means; slots at the outer ends of the guide means communicating with the channels on the faces of the guide means, and resilient gripping means attached to the neck portion between which the dental floss may be extended, arranged to be brought into gripping engagement with the dental floss to hold same in fixed position.

7. The combination called for in claim 1 wherein the gripping means includes a grasping portion extending adjacent the handle whereby same may be grasped between the fingers and thumb of the user.

8. The combination called for in claim 6 wherein the gripping means is comprised of a pair of flexible gripping members, there being one on each side of the neck portion.

9. The combination called for in claim 8 wherein each gripping member has a grasping portion extending adjacent the handle whereby same may be gripped between the fingers and thumb of the user.

References Cited

UNITED STATES PATENTS

| | | | |
|---|---|---|---|
| 2,187,442 | 1/1940 | Beach | 132—92 |
| 2,467,221 | 4/1949 | Pastl | 132—92 |
| 2,544,276 | 3/1951 | Ness | 132—92 |

F. BARRY SHAY, Primary Examiner

G. E. McNEILL, Assistant Examiner